Feb. 27, 1951 R. W. SWANK 2,543,590
COUPLING
Filed Jan. 28, 1948 3 Sheets-Sheet 1

Inventor
Rehl W Swank
Ralph Hammar
Attorney

Feb. 27, 1951 R. W. SWANK 2,543,590
COUPLING
Filed Jan. 28, 1948 3 Sheets-Sheet 2

Inventor
Rehl W Swank
Ralph Hammar
Attorney

Feb. 27, 1951   R. W. SWANK   2,543,590
COUPLING

Filed Jan. 28, 1948   3 Sheets-Sheet 3

Inventor
Ralph W Swank
By Ralph Hammar Attorney

Patented Feb. 27, 1951

2,543,590

UNITED STATES PATENT OFFICE 2,543,590

COUPLING

Rehl W. Swank, Edinboro, Pa., assignor to Erie Meter Systems, Inc., Erie, Pa., a corporation of Pennsylvania Application January 28, 1948, Serial No. 4,900

11 Claims. (Cl. 284—4)

This is a continuation in part of my application, #606,912, filed July 25, 1945, now abandoned.

In disconnectable couplings for fluid lines it is desirable that both mating parts of the coupling be provided with valves which may be closed before the coupling connection is broken so as to prevent loss of fluid. This is of particular advantage in handling inflammable or toxic fluids such as gasoline. It is also desirable that the coupling be locked prior to the opening of the valves. This invention is intended to provide a simplified construction of the valves and operating mechanism for attaining these objects. Further objects and advantages appear in the specification and claims.

Figures 1, 2:
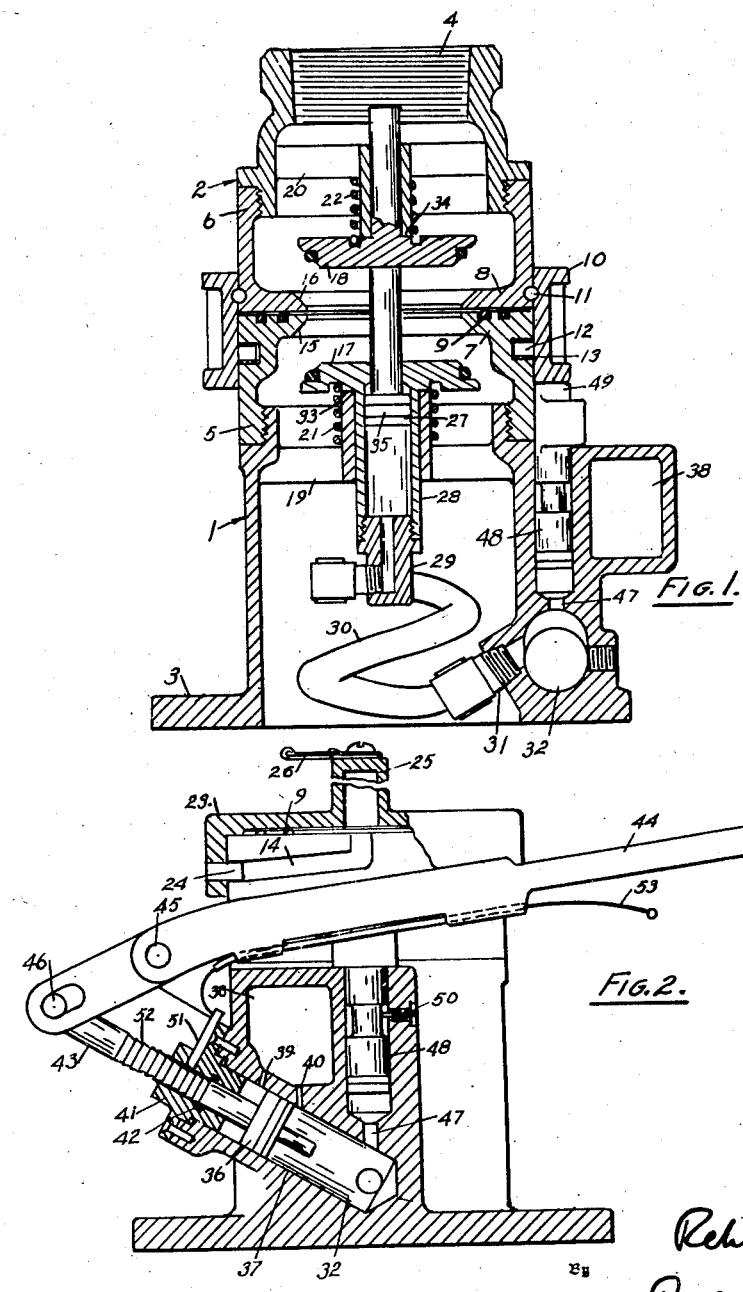
Figure 3:
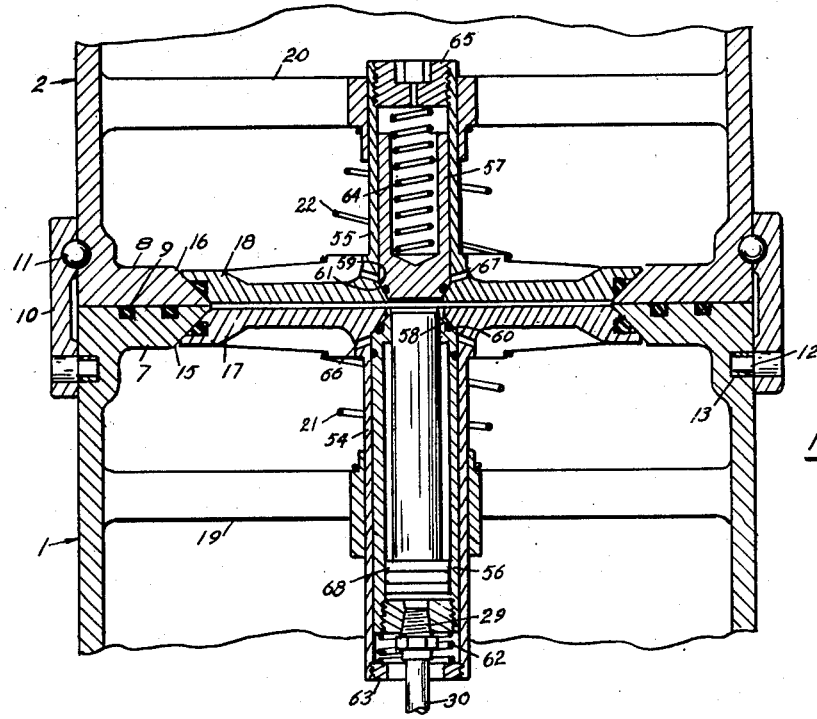
Figure 4:
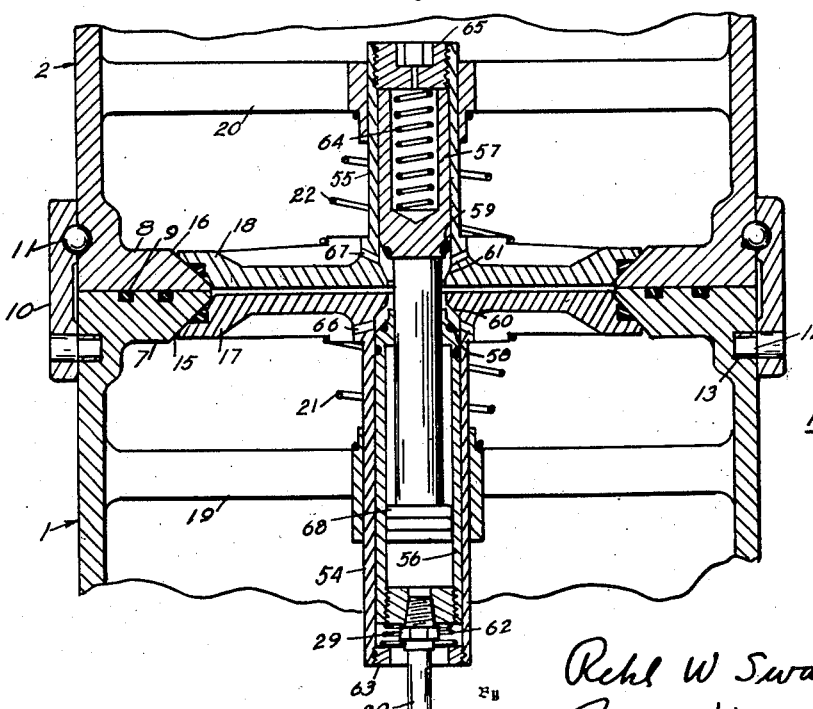
Figure 5:
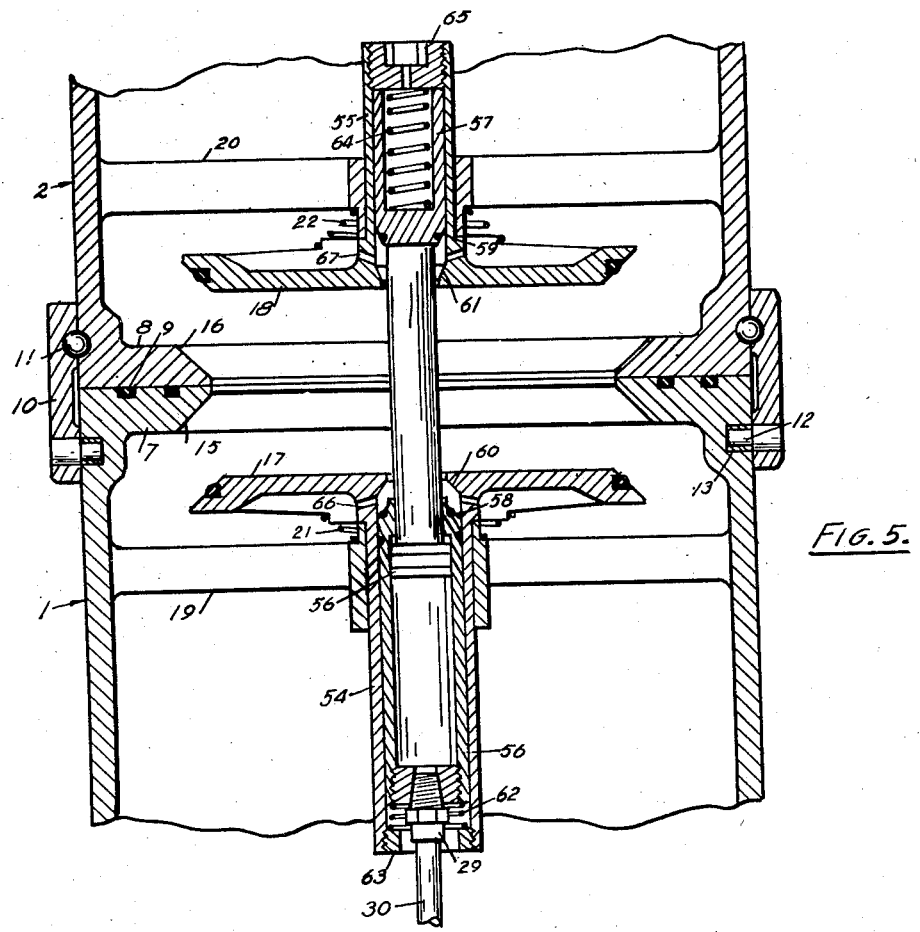

In the drawing, Fig. 1 is a sectional elevation of a coupling embodying my invention; Fig. 2 is a side elevation, partly in section; Fig. 3 is a fragmentary section through a modification showing the valves in the closed position; Fig. 4 is a similar view showing the valves at the start of the opening movement; and Fig. 5 is a similar view showing the valves in the full open position.

In the drawing 1 and 2 indicate mating parts of the coupling, part 1 having a flange 3 for connection with a flange union, and the part 2 being threaded at 4 to receive a hose coupling. The adjacent ends of the coupling parts have threaded sleeves 5 and 6 having abutting flanges 7 and 8, one of which carries sealing rings 9. In the assembled position shown in Fig. 1 the flanges 7 and 8 are clamped together by a coupling sleeve 10 rotatably carried on the sleeve 6 by a ball bearing 11 and having inwardly extending arms 12 carrying needle bearings 13 received in bayonet slots 14 on the sleeve 5. The bearings 11 and 13 together with the shallow pitch of the bayonet slots make it relatively easy to clamp the coupling parts together.

On opposite sides of the flanges 7 and 8 are tapered seats 15 and 16 for poppet valves 17 and 18 slidably carried in spiders 19 and 20 on the coupling parts 1 and 2. The valves are urged against the seats by springs 21 and 22 arranged between the spiders 19 and 20 and the heads of the respective valves. In the closed position the heads of the valves are close to but short of contact so that the valves may be closed before the coupling connection is broken. Upon breaking the coupling connection only the negligible amount of fluid between the flanges 7 and 8 and the heads of the valves 17 and 18 is exposed. The rest of the fluid is trapped in the respective coupling parts. When the coupling connection is broken, the coupling part 1 may be covered by a dust cap 23 having inwardly extending arms 24 for operating with the bayonet slot 14. The dust cap has a hollow stem 25 which serves as a convenient attaching point for a chain 26 leading to a suitable lug (not shown) on the coupling part 1.

After the couplings are assembled, the valves 17 and 18 are opened by a piston 27 slidably carried in the stem 28 of the valve 17. The lower end of the valve stem is closed by a fitting 29 connected by a flexible hose 30 to a fitting 31 in the side wall of a fluid pressure chamber 32 integral with the coupling part 1. Upon supplying fluid pressure to the hose 30, the piston 27 is forced upward against the head of the valve 18. The fluid pressure applied to the piston tends to force the valve 17 downward and the valve 18 upward. Since the fluid pressure opposing the movement of the valves 17 and 18 may be different, it is not possible to tell which of the valves will move first. In the final open position the valve 17 will rest against a stop 33 on the spider 19, and the valve 18 will rest against a stop 34 on the spider 20. When the coupling connection is to be broken the fluid pressure in the hose 30 is released and the valves are moved to the closed position by the springs 21 and 22.

It will be noted that the opening and closing forces exerted on the valves 17 and 18 are directly in line with the valve stems so there is no tendency for the valves to bind. This is important because the fluid passing through the coupling may be of a nature which would interfere with, or prevent, lubrication of the valve stem guides. The hydraulic operating fluid supplied through the flexible hose 30 is sealed from the fluid flowing through the coupling by a rubber ring 35 in the piston 27.

The fluid pressure in the chamber 32 is controlled by a piston 36 slidable in a cylinder 37 integral with one side of the chamber 32. On the upper side of the cylinder 37 is a fluid reservoir 38 integral with the coupling part 1 and communicating with the cylinder 37 through ports 39 and 40. The outer end of the cylinder 37 is closed by a fitting 41 carrying a packing ring 42 for the piston rod 43. The piston 36 is moved in and out of the cylinder 37 by a lever 44 pivoted at 45 and having a pin and slot connection 46 with the outer end of the piston rod 43. Upon lifting up on the lever 44 the piston 36 is moved inward. Upon inward movement of the piston no pressure is developed in the chamber 32 until the piston moves past the port 40. Thereafter pressure builds up in the chamber 32 at a rate determined by the relative areas of the pistons 27 and 36. The initial build-up of pressure in the chamber 32 is transmitted through a passage 47 to a locking piston 48, urging the upper end 49 of the piston against a suitable knurled undersurface of the coupling sleeve 10. This positively locks the coupling sleeve 10 and prevents breaking of the coupling connection so long as there is fluid pressure in the chamber 32. The locking piston 48 has its upward travel limited by a stop 50 which keeps the locking piston safely within its cylinder. The upward movement of the locking piston starts prior to any movement of the valve opening piston 27, since the movement of the locking piston is resisted solely by its weight, while the movement of the valve opening piston is opposed by the force required to open the valves 17 and 18. This differential is sufficiently great so that the locking piston assumes its locking position prior to any movement of the valve operating piston.

The fitting 41 carries a spring detent 51 cooperating with ratchet teeth 52 in the piston rod 43 to hold the piston in its lowermost position corresponding to the open position of the valves 17 and 18. The detent 51 may be released by a pull member 53 permitting downward movement of the operating lever 44, and the corresponding outward movement of the piston 36 to relieve the fluid pressure in the chamber 32.

When the coupling 2 is disconnected and the dust cap 23 is in place on the coupling 1, an upward movement of the lever 44 causes movement of the locking piston 48 into engagement with the lower edge of the dust cap 23 and also causes upward movement of the piston 27 into the hollow stem 25 without exerting any back pressure on the valve 17. If the dust cap 23 is not in place the locking piston 48 moves upward to the limit permitted by the stop 50, and the valve actuating piston 27 moves upward to its limit of travel in the valve stem 28 without exerting any opening force on the valve 17. This prevents accidental opening of the valve 17 by upward movement of the lever 44.

In Figs. 3, 4, and 5 is shown a coupling adapted for larger diameters where the initial force required to open the valves becomes so great as to make the Figs. 1 and 2 construction undesirable. Corresponding parts are indicated by the same reference numerals.

As in the previously described construction the poppet valves 17 and 18 are urged by springs 21 and 22 against seats 15 and 16 on flanges 7 and 8. The valves 17 and 18 have stems 54 and 55 guided in the spiders 19 and 20. Within each of the valve stems are plungers 56 and 57 having tapered surfaces 58 and 59 engaging seats 60 and 61 at the center of the valves 17 and 18. The plunger 56 is urged against its seat by a spring 62 arranged between the lower end of the plunger and an abutment 63 on the valve stem 54. The plunger 57 is urged against its seat 61 by a spring 64 arranged between the plunger and an abutment 65 on the valve stem 55. In the extended position shown in Fig. 3 the plungers 56 and 57 close ports 66 and 67 in the valves 17 and 18. In this position the adjacent ends of the plungers 56 and 57 constitute substantially direct continuations of the adjacent surfaces of the valves 17 and 18. The lower end of the plunger 56 carries the fitting 29 connected to the hydraulic pressure line 30 which feeds the hydraulic pressure into the interior of the plunger 56 and builds up a pressure against a piston 68 which corresponds to the valve operating piston 27. The upper end of the piston 68 cooperates with the plunger 57 and exerts a force tending to move the plungers 56 and 57 apart in the same manner that the valve operating plunger 27 acts on the valves 17 and 18. Fig. 4 illustrates the position of the plungers 56 and 57 at the start of the upward movement of the piston 68. In this position the plungers 56 and 57 have moved apart sufficient to uncover the ports 66 and 67, permitting a free flow of fluid through the ports to equalize the fluid pressure on opposite sides of valves 17 and 18. Upon continued upward movement of the piston 68 the valves 17 and 18 are moved away from their seats to the full open position shown in Fig. 5. Because the fluid pressure on opposite sides of the valves is equalized through the ports 66 and 67, the opening movement of the valves 17 and 18 does not require excessive pressure.

What I claim as new is:

1. A fluid coupling having detachable mating parts, valves closing the respective parts in the assembled position of the coupling, a cylinder in one of the valves, a piston in the cylinder extensible into engagement with the other valve, and means supplying fluid pressure between the piston and cylinder.

2. A fluid coupling having detachable mating parts, valves biased toward each other to close the respective parts, said valves being short of contact in the assembled position of the coupling, a cylinder in one of the valves, a piston in the cylinder cooperating with the other valve, and means supplying fluid pressure between the piston and cylinder for forcing the valves apart to open the same.

3. A fluid coupling having detachable mating parts, valves biased toward each other to close the respective parts, said valves being short of contact in the assembled position of the coupling, a piston in one of the valves for forcing the valves apart to open the same, and a flexible fluid line connected to said one valve supplying the operating pressure to the piston.

4. A fluid coupling having detachable mating parts, opposed poppet valves in the respective parts, springs biasing the valve toward each other, seats on the respective parts engageable by the valves in the assembled position of the coupling, a cylinder in one of the valves, a piston in the cylinder engageable with the other valve, and means supplying fluid pressure between the piston and cylinder for forcing the valves apart and away from the seats.

5. A fluid coupling having detachable mating parts, opposed poppet valves in the respective parts, springs biasing the valves toward each other, seats on the respective parts engageable by the valves in the assembled position of the coupling, an extensible operating member carried in one of the valves and movable against the other valve, and means applying a force from said one valve to extend the operating member whereby the force is applied through the operating member to the other valve and the reaction of said force is applied to said one valve and said force is effective to move the valves away from their respective seats.

6. A fluid coupling having detachable mating parts, opposed poppet valves in the respective parts, springs biasing the valves toward each other, seats on the respective parts engageable by the valves in the assembled position of the coupling, a plunger guided in one of the valves and movable against the other valve, a seal for the plunger, stops limiting the separation of the valves, and means applying an operating pressure from said one valve to the plunger to move the plunger against the other valve whereby the force is applied through the plunger to the other valve and the reaction of said force on said one valve is applied to said one valve and said force is effective to move the valves away from their respective seats.

7. A fluid coupling having detachable mating parts, valves closing the respective parts in the assembled position, a locking piston for preventing disassembly of the coupling, a valve operating piston for opening the valves, and means supplying fluid pressure to the pistons.

8. A fluid coupling having detachable mating parts, opposed poppet valves in the respective parts, springs biasing the valves toward each other, seats on the respective parts engageable by the valves in the assembled position of the coupling, a coupling sleeve on one of the coupling parts for securing the coupling parts together, a locking piston on the other coupling part for engaging and locking the coupling sleeve, a piston in the valve on said other coupling part for forcing the valves apart and away from their seats, and means supplying fluid pressure to the pistons.

9. A fluid coupling having detachable mating parts, valves closing the respective parts in the assembled position, a locking piston for preventing disassembly of the coupling, a valve operating piston for opening the valves, means supplying fluid pressure to the pistons, and the valve operating piston encountering greater resistance to valve opening movement than the locking piston encounters to locking movement than to movement of the locking piston by the fluid pressure whereby the locking piston is moved to the locking position prior to opening of the valves.

10. A fluid coupling having detachable mating parts, opposed poppet valves having stems guided in the respective parts, springs biasing the valves toward each other, seats on the respective parts engageable by the valves in the assembled position of the coupling, plungers in the respective valve stems biased to close ports in the respective valves, a piston in one of the plungers movable against the other plunger to open the ports, means applying an operating pressure between the piston and its plunger, and abutments transferring force from the plungers to the valves.

11. A fluid coupling having detachable mating parts, valves closing the respective parts in the assembled position of the coupling, hydraulic actuating means exerting forces moving the valves to the open position, and means supplying fluid pressure to the hydraulic means.

REHL W. SWANK.

REFERENCES CITED

The following references are of record in the file of this patent:

UNITED STATES PATENTS

| Number | Name | Date |
|---|---|---|
| 687,253 | Morgan | Nov. 26, 1901 |
| 1,156,049 | Bopp | Oct. 12, 1915 |
| 2,131,271 | Coles et al. | Sept. 27, 1938 |

FOREIGN PATENTS

| Number | Country | Date |
|---|---|---|
| 197,436 | Great Britain | May 17, 1923 |